United States Patent [19]
Ohmi

[11] Patent Number: 5,961,158
[45] Date of Patent: Oct. 5, 1999

[54] WELDED MEMBER AND CLEAN ROOM

[76] Inventor: Tadahiro Ohmi, 1-17-301, Komegabukuro 2-chome, Aoba-ku, Sendai Miyagi-ken 980, Japan

[21] Appl. No.: 08/710,735

[22] Filed: Sep. 20, 1996

[30]     Foreign Application Priority Data

Sep. 20, 1995  [JP]  Japan ................................. 7-242187

[51] Int. Cl.⁶ ...................................................... F16L 13/02
[52] U.S. Cl. .............. 285/288.1; 285/422; 219/137 WM
[58] Field of Search ............................ 285/288.1, 288.2, 285/288.3, 288.4, 288.5, 288.6, 288.7, 288.8, 288.9, FOR 163, 328, 422; 219/137 WM

[56]       References Cited

U.S. PATENT DOCUMENTS

| | | | |
|---|---|---|---|
| 3,677,908 | 7/1972 | Sperl | 205/164 |
| 4,119,765 | 10/1978 | Pinnow | 428/683 |
| 4,685,707 | 8/1987 | Miyashita | 285/328 |
| 4,853,284 | 8/1989 | Ishii et al. | 428/335 |
| 4,950,552 | 8/1990 | Amend et al. | 428/626 |
| 5,440,090 | 8/1995 | Davis et al. | 219/61 |

*Primary Examiner*—D. W. Arola
*Attorney, Agent, or Firm*—Randall J. Knuth

[57]            ABSTRACT

A welded material composed of welded ferritic stainless steel in which the outermost surface of the welded part contains a chromium oxide surface containing no iron oxides.

8 Claims, 5 Drawing Sheets

WELDED MEMBER AND CLEAN ROOM

TECHNICAL FIELD OF THE INVENTION

The present invention relates to welded members, piping, a piping system, and to a welding method and a clean room.

BACKGROUND ART

Gas supply pipes are employed in which, after a passivated film, the surface of which comprises solely chromium oxide [does not contain iron oxides] is formed on the inner surface of pipes comprising an austenitic stainless steel such as SUS 316 or the like, the pipes are welded together.

However, when such gas supply pipes are employed, the life span of the pipes is extremely short. Accordingly, it is necessary to replace the pipes at extremely short intervals, and this involves a great deal of work and expense. Furthermore, as a result of such replacement, there is a tendency for the degree of cleanliness within the clean room to decline.

Upon investigating the causes of the short lifespan of such pipes, the present inventors have discovered that passivated films containing iron oxides are formed at the welded parts, and corrosion is generated at these parts.

PROBLEM TO BE SOLVED BY THE INVENTION

The present invention has as an object thereof to provide welded members and pipes having superior corrosion resistance.

The present invention has as an object thereof to provide a piping system which has a very long life span and which requires almost no replacement.

The present invention has as an object thereof to provide a maintenance-free clean room having a high degree of cleanliness.

The present invention has as an object thereof to provide a welding method which is capable of producing welded parts having superior corrosion resistance.

MEANS FOR SOLVING THE PROBLEMS

The welded members of the present invention are characterized in that the outermost surfaces of the welded parts at which ferritic stainless steel is welded together are chromium oxide surfaces containing no iron oxides.

The piping of the present invention is characterized in that the outermost surface of the welded parts at which pipes comprising ferritic stainless steel are welded together are chromium oxide surfaces containing no iron oxides.

The piping system of the present invention is characterized in that pipes are employed in which the outermost surfaces of the welded parts at which pipes comprising ferritic stainless steel are welded together are chromium oxide surfaces containing no iron oxides.

The welding method of the present invention is characterized in that, after welding ferritic stainless steel together, a gas possessing oxidizing activity is caused to flow over the welded part, and an arc which is not sufficient to melt the welded part is applied to the welded part.

The clean room of the present invention is characterized in that the gas supply pipes disposed within the clean room are pipes in which the outermost surface of the welded part at which pipes comprising ferritic stainless steel are welded to one another is a chromium oxide surface containing no iron oxides.

EMBODIMENT MODES OF THE INVENTION

The ferritic stainless steel employed in the present invention should preferably be stainless steel containing 25 weight percent or more of chromium.

By means of setting the welding current after welding to 3–6 A, it is possible to more satisfactorily form a passivated film comprising chromium oxide which does not contain iron oxides. When the current is less than 3 A, the arc generation is insufficient, and a long period of time is required for the formation of a passivated film comprising chromium oxide which does not contain iron oxides. On the other hand, when the current is in excess of 6 A, there is a possibility that the welded part will melt. Accordingly, the range of 3–6 A is preferable.

The gas having an oxidizing activity which is caused to flow after welding is preferably a gas in which oxygen is contained in argon gas.

At this time, it is preferable that the oxygen concentration be 5 ppm or greater and less than 50 ppm. When the concentration is less than 5 ppm, a passivated film containing iron oxides may be formed depending on the conditions, and the control of these conditions is difficult. When the concentration is greater than or equal to 50 ppm, the oxygen may be in excess depending on the conditions, so that a passivated film containing iron oxides may be formed. A concentration within a range of 25 ppm–35 ppm is especially preferable.

Hydrogen may be added to the mixed gas of argon and oxygen. In such a case, the surface roughness will decrease, and this is preferable.

A gas in which moisture is contained in argon gas may be employed as the gas having an oxidizing activity.

The rotational speed after welding should preferably be within a range of, for example, 6–8 rpm in the case of a pipe having a ¼ inch diameter. At speeds of less than 4 rpm, the passivated film becomes too thick (400 Å or more), and peeling may occur. Furthermore, when the speed is in excess of 8 rpm, there are cases in which no passivated film is formed.

A graph showing the results of an XPS test of a passivated film formed in accordance with (a) of experimental example 1.

FIG. 2

A graph showing the results of an XPS test of a passivated film formed in accordance with (b) of experimental example 1.

FIG. 3

A graph showing the results of an XPS test of a passivated film formed in accordance with (c) of experimental example 1.

FIG. 4

A graph showing the results of an XPS test of a passivated film formed in accordance with (a) of experimental example 2.

FIG. 5

A graph showing the results of an XPS test of a passivated film formed in accordance with (b) of experimental example 2.

FIG. 6

A graph showing the results of an XPS test of a passivated film formed in accordance with (c) of experimental example 2.

FIG. 7

A graph showing the results of an XPS test of a passivated film formed in accordance with (d) of experimental example 2.

FIG. 8

A graph showing the results of an XPS test of a passivated film formed in accordance with (a) of experimental example 3.

FIG. 9

A graph showing the results of an XPS test of a passivated film formed in accordance with (b) of experimental example 3.

FIG. 10

A graph showing the results of an XPS test of a passivated film formed in accordance with (c) of experimental example 3.

EMBODIMENTS

Experimental Example 1

Pipes having a diameter of ¼ inch and comprising ferritic stainless steel (brand name: FS 10) were subjected to oxidation treatment in an atmosphere of hydrogen, oxygen, and argon gas having a moisture concentration of 100 ppm, and a 100% chromium oxide passivated film was formed on the inner surfaces of the pipes.

Next, the welding of the ferritic stainless steel pipes on which a 100% chromium oxide film had been formed was conducted by means of the tungsten inert gas welding method. In this welding method, welding was conducted initially for 1 revolution, and then oxide passivation treatment was conducted under conditions such that the welding speed of the second revolution was 3 rpm, and the current was 3 A.

The bead width (BW) of the weld was set at 2 mm. Furthermore, welding was conducted while allowing a back shield gas to flow within the pipes. Welding was conducted using back shield gases (BSG) in which a variety of concentrations of oxygen was added to argon gas. The welded pipe samples obtained were produced under conditions such that the following oxygen concentrations were added: (a) no oxygen added, (b) 1 ppm, (c) 50 ppm.

Figure 1:
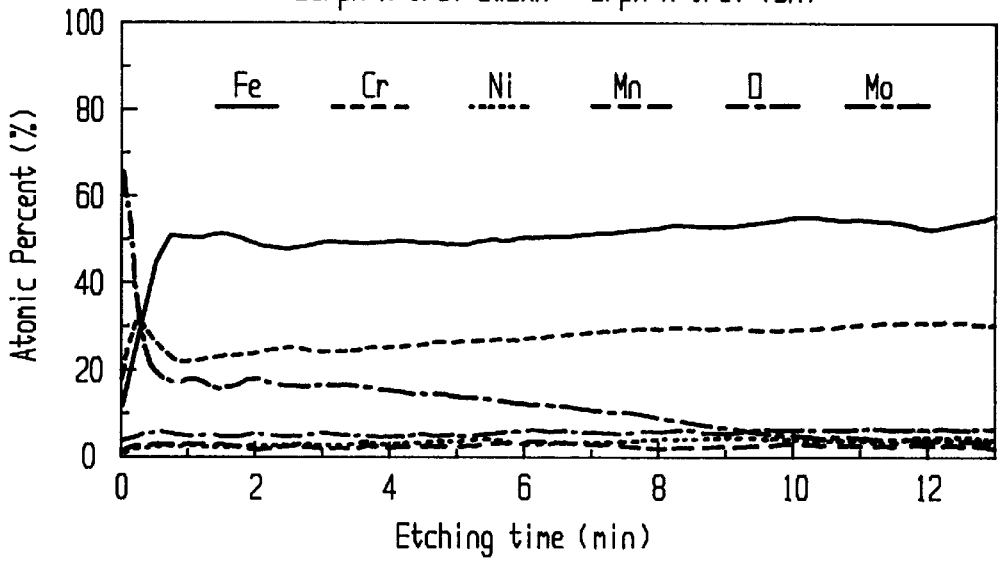
FIG. 1
Figure 2:
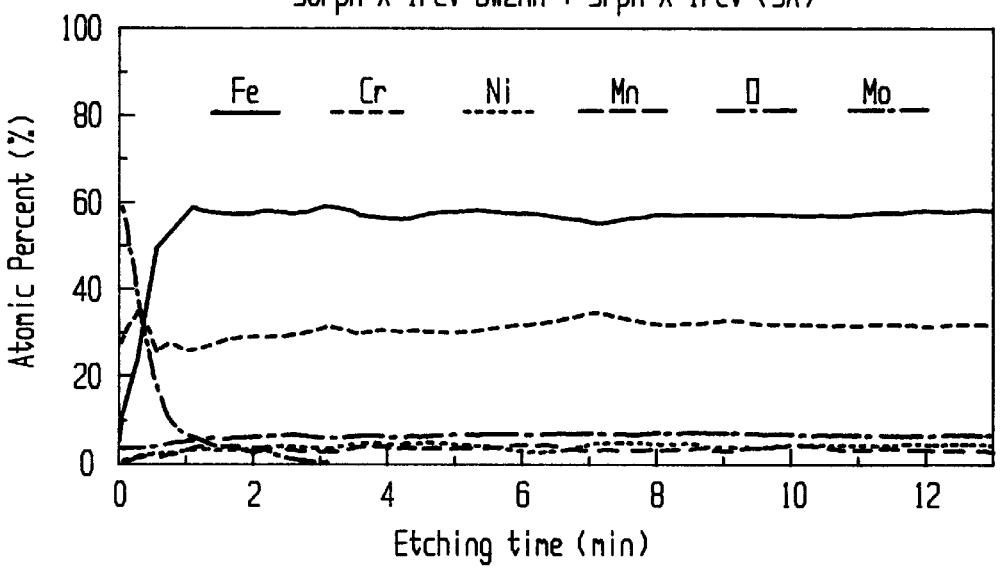
Figure 3:
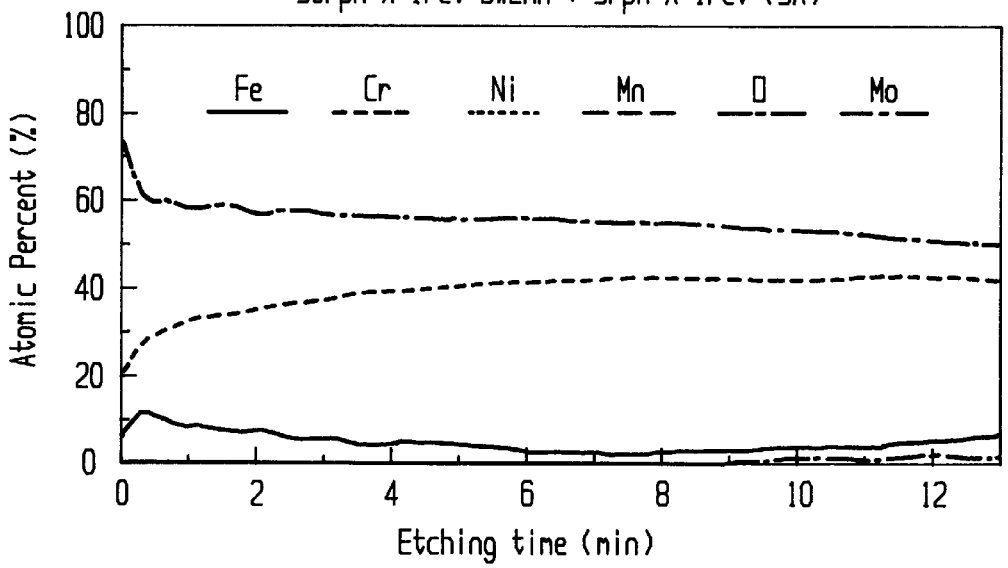

After the conclusion of welding, the pipes were severed, and the component distribution in the direction of depth of the surface of the welded part was analyzed using XPS (X-ray photoelectric spectroscopy). The results thereof are shown in FIG. 1 (in the case of (a)), FIG. 2 (in the case of (b)), and FIG. 3 (in the case of (c)). Furthermore, the horizontal axis in these diagrams indicates the etching time of the surface by means of sputtering; one minute of etching time corresponds to approximately a film thickness of 7 nm.

As is clear from the figures, the case in which 1 ppm of oxygen was added to the back shield gas (FIG. 2) exhibited results which were essentially identical with those of the case in which no oxygen was added and welding was conducted (FIG. 1); it can be seen that the amount of oxygen added was insufficient for the formation of a chromium oxide passivated film. Furthermore, it can be seen that in the case in which an oxygen concentration of 50 ppm was added and welding was conducted (FIG. 3), 100 nm or more of an oxide passivated film comprising a mixture of iron and chromium oxides was formed, so that oxygen was present in excess.

Experimental Example 2

Ferritic stainless steel pipes having a diameter of ¼ inch were subjected to an oxidation treatment in an atmosphere of hydrogen, oxygen, and argon gases containing a moisture concentration of 100 ppm, and a 100% chromium oxide passivated film was formed on the inner surfaces of these pipes.

Figure 4:
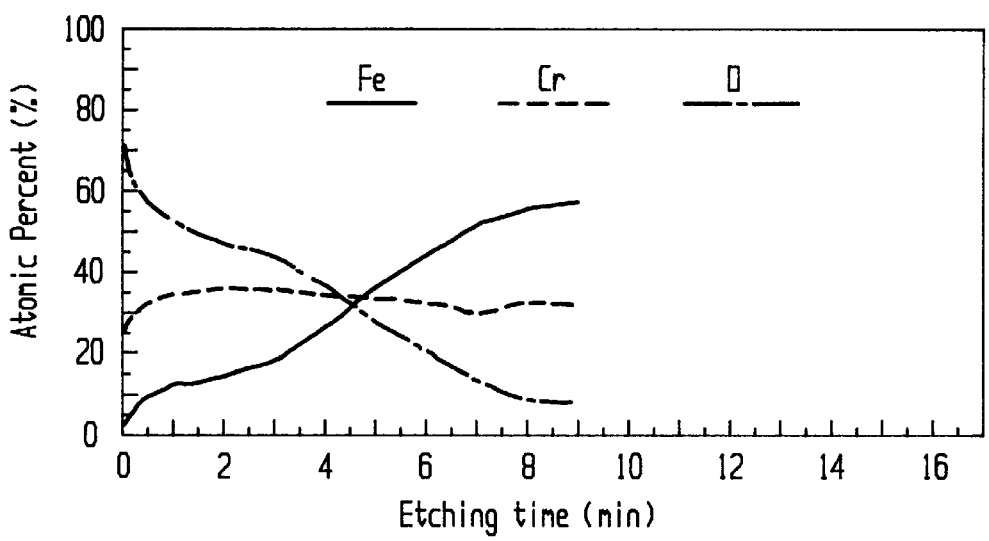
Figure 5:
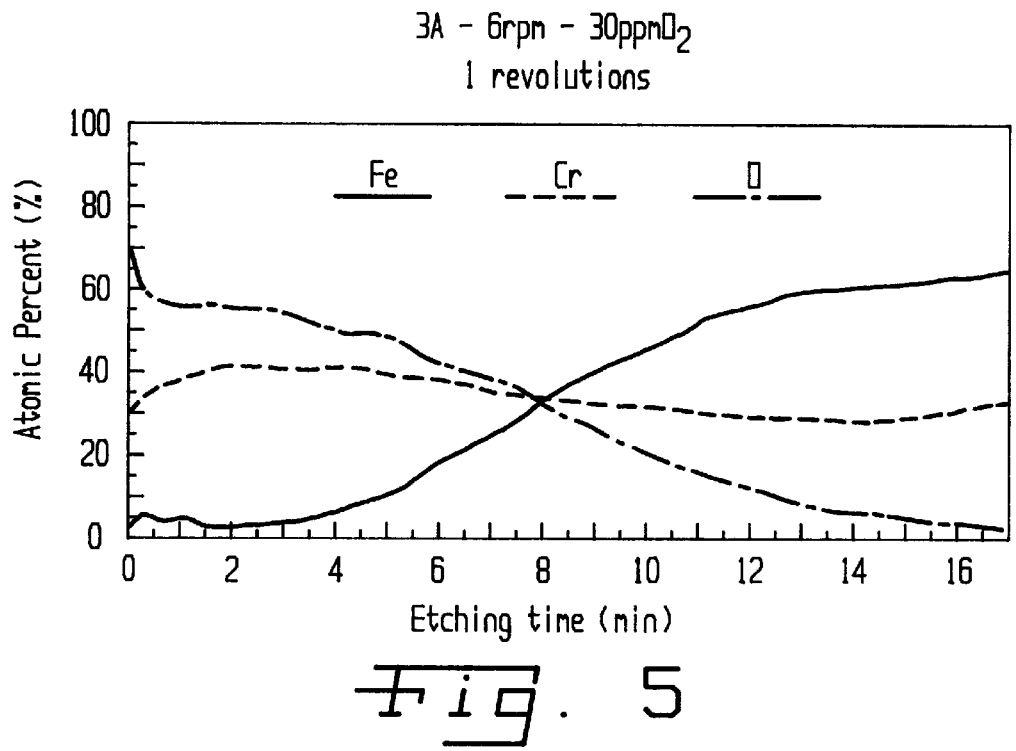
Figure 6:
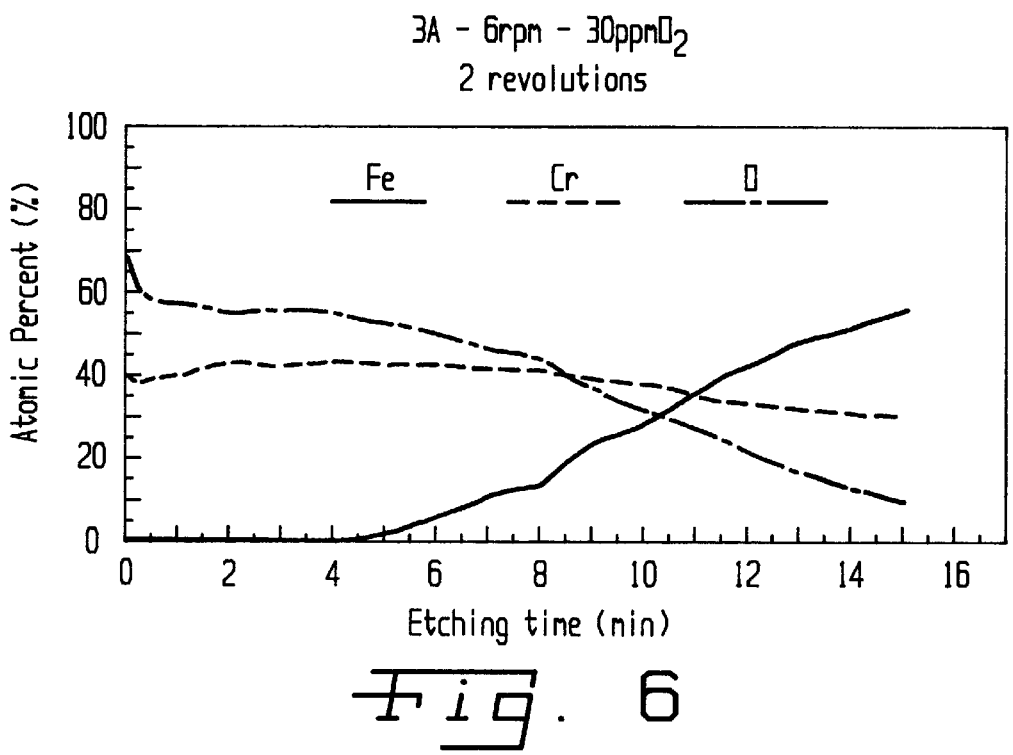

Next, the ferritic stainless steel pipes having a 100% chromium oxide passivated film thereon were subjected to welding by means of a tungsten inert gas welding method. In this welding method, welding was conducted initially for one revolution, and then the welded bead was rotated for 0–3 revolutions under conditions such that the welding speed was 6 rpm from the second revolution onward, and the current was 3 A, and oxide passivation treatment was thus conducted. Welding was conducted using, as a back shield gas, argon gas to which 30 ppm of oxygen gas had been added. The welded pipe samples obtained were produced using the following revolutions: (a) 0 revolutions, (b) 1 revolution, (c) 2 revolutions, (d) 3 revolutions. After the completion of welding, the pipes were severed, and the component distribution in the direction of depth of the surface of the welded part was analyzed using XPS (X-ray photoelectric spectroscopy). The results thereof are shown in FIG. 4 (in the case of (a)), FIG. 5 (in the case of (b)), and FIG. 6 (in the case of (c)). Furthermore, the horizontal axis in the figures indicates the etching time of the surface by means of sputtering; an etching time of 1 minute corresponds to a film thickness of approximately 7 nm.

As is clear from the figures, it can be seen that an oxide film is formed under any conditions in which the number of revolutions is within a range of 0–3. It can be seen that under these conditions, in the case in which the number of revolutions is 2 (FIG. 6) and 3, the oxide passivated film contains no iron to a depth of approximately 30 nm from the outermost surface, so that a 100% chromium oxide passivated film is formed.

Experimental Example 3

Ferritic stainless steel pipes having a diameter of ¼ inch were subjected to an oxidation treatment in an atmosphere of hydrogen, oxygen, and argon gases containing a moisture concentration of 100 ppm, and a 100% chromium oxide passivated film was formed on the inner surfaces of the pipes.

Next, the ferritic stainless steel pipes having a 100% chromium oxide passivated film formed thereon were subjected to welding by means of a tungsten inert gas welding method. In this welding method, welding was initially conducted for one revolution and then the welded bead was rotated for three revolutions under conditions such that the welding speed was 6 rpm from the second revolution onward, and the current was 3 A, and oxide passivation treatment was thus conducted. Welding was conducted using a variety of back shield gases in which a variety of concentrations of oxygen gas were added to argon gas. The welded pipe samples obtained were produced under oxygen concentrations of: (a) 25 ppm, (b) 30 ppm, and (c) 35 ppm.

Figure 7:
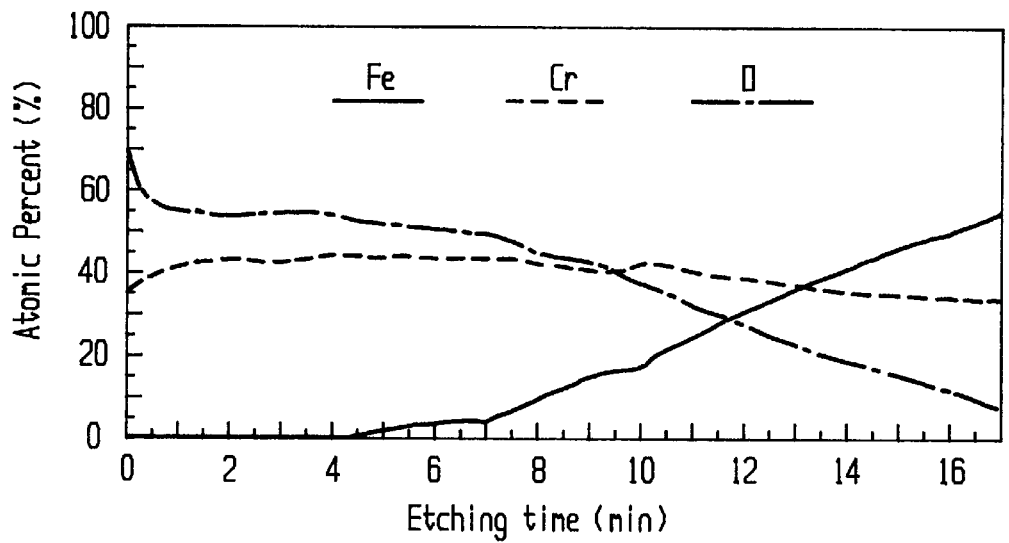
Figure 8:
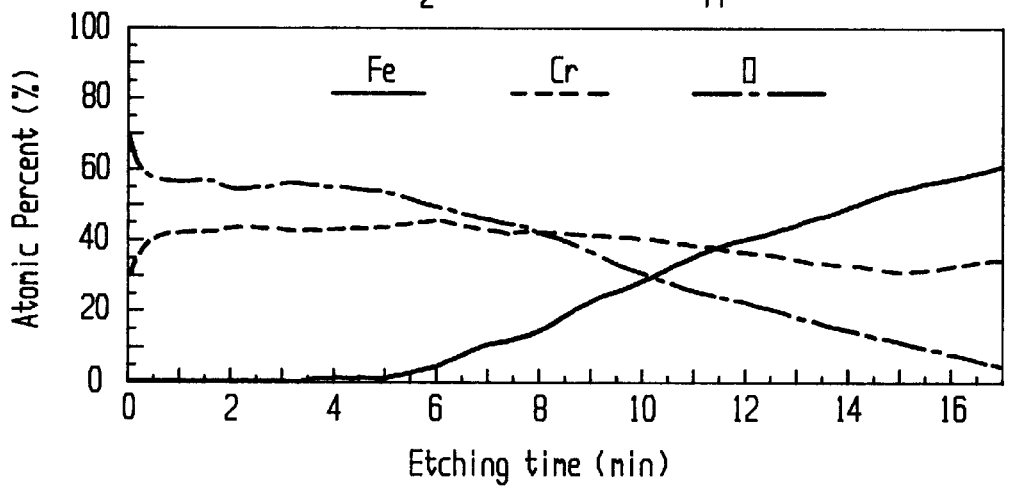
Figure 9:
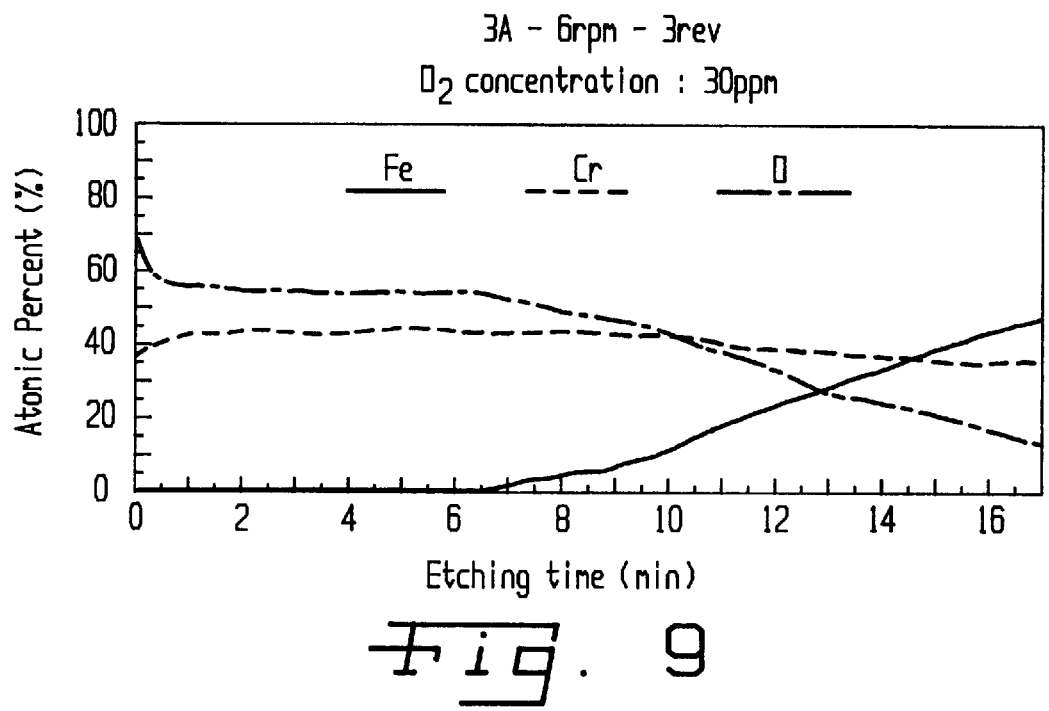
Figure 10:
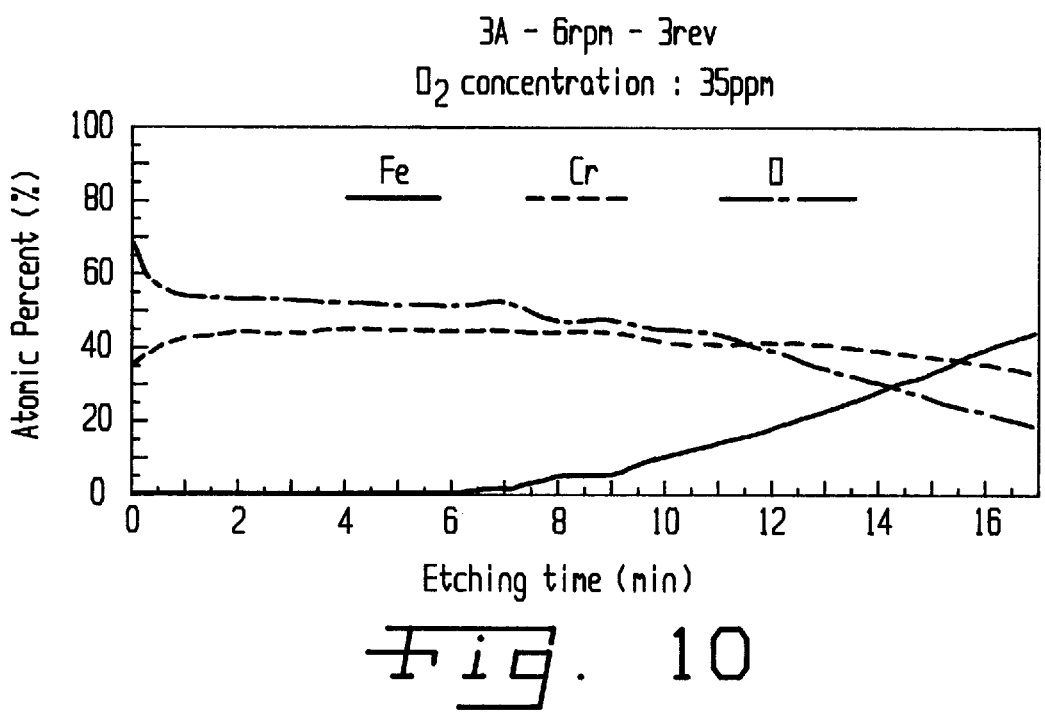

After the completion of welding, the pipes were severed, and the component distribution in the direction of depth of the surface of the welded part was analyzed using XPS (X-ray photoelectric spectroscopy). The results are shown in FIG. 7 (in the case of (a)), FIG. 8 (in the case of (b)), and FIG. 9 (in the case of (c)). Furthermore, the horizontal axis in the figures indicates the etching time of the surface by means of sputtering; an etching time of 1 minute corresponds to a film thickness of approximately 7 nm.

As is clear from the figures, under these conditions (current, rotational speed, number of revolutions) a 100% chromium oxide passivated film containing absolutely no iron is formed to a film thickness of a few tens of nm from the outermost surface in the region in which the oxygen concentration is within a range of 25 ppm–35 ppm. Additionally, it can be seen that the film thickness has a tendency to increase as the oxygen concentration increases.

EFFECTS OF THE INVENTION

In accordance with the present invention, it is possible to provide welded members and pipes having superior corrosion resistance.

In accordance with the present invention, it is possible to provide a piping system having a long life span and which requires almost no replacement.

In accordance with the present invention, it is possible to provide a maintenance-free clean room having a high degree of cleanliness.

In accordance with the present invention, it is possible to provide a welding method which is capable of producing welded members having superior corrosion resistance.

I claim:

1. A welded member, characterized in that the outermost surface of a welded part at which ferritic stainless steels are welded together is a chromium oxide surface containing no iron oxides.

2. A welded member in accordance with claim 1, characterized in that said ferritic stainless steel comprises stainless steel containing 25 weight % or more of chromium.

3. Piping, characterized in that an outermost surface of a welded part at which pipes comprising ferritic stainless steel are welded together is a chromium oxide surface containing no iron oxides.

4. Piping in accordance with claim 3, characterized in that said ferritic stainless steel comprises stainless steel containing 25 weight % or more of chromium.

5. A piping system, characterized in that pipes are employed in which the outermost surface of the welded part at which pipes comprising ferritic stainless steel are welded to one another is a chromium oxide surface containing no iron oxides.

6. A piping system in accordance with claim 5, characterized in that ferritic stainless steel comprises stainless steel containing 25 weight % or more of chromium.

7. A clean room, characterized in that gas supply pipes disposed therewithin comprise pipes in which the outermost surface of welded parts at which pipes comprising ferritic stainless steel are welded to one another is a chromium oxide surface containing no iron oxides.

8. A clean room in accordance with claim 7, characterized in that said ferritic stainless steel comprises stainless steel containing 25 weight % or more of chromium.

* * * * *